United States Patent Office 2,888,825
Patented June 2, 1959

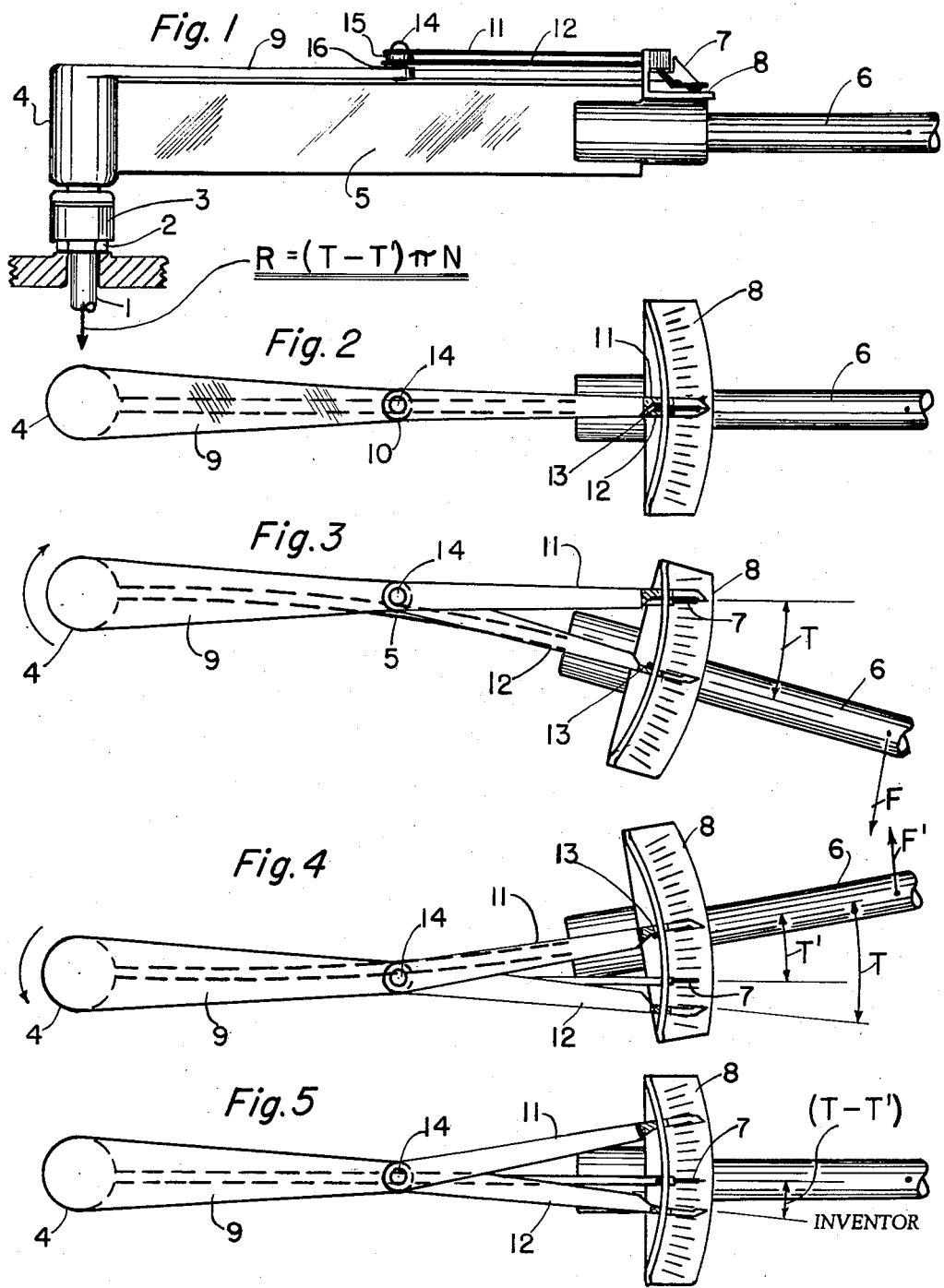

2,888,825

DEVICE FOR DETERMINING AXIAL FORCE EXERTED BY A SCREW FROM TORQUE MEASUREMENTS

Joseph M. Krafft, Alexandria, Va.

Application November 14, 1955, Serial No. 546,720

5 Claims. (Cl. 73—139)

My invention relates to a device to be used in conjunction with a torque measuring wrench whereby, in addition to the usual measure of applied torsion, a direct measure is obtained of the axial force exerted by a screw as a result of the applied torsion. The axial force is ascertained from a measurement of the difference between the final torque required to tighten and the torque required to thereafter being to loosen a screw member. The axial force as measured by this difference of torques is essentially independent of the magnitude of the frictional resistance inherent in the sliding, load-bearing surfaces of the screw.

In present practice, torque is measured on a screw member to give some control over the holding force exerted by the screw member and/or to limit the axial stress induced in the screw member to a safe value. The torque on a screw is, however, a rather uncertain measure of axial force as it is generally true that the axial thrust can be determined from a single torsion measurement only to the accuracy to which the coefficient of friction is known. In practice, differing surface conditions will cause wide variation in frictional adhesion. As a consequence, loading a screw to a specified torque may result in overstress, or even failure of a screw member if the surface friction is reduced, as by lubrication. On the other extreme when high surface friction prevails on the sliding surfaces loss of effectiveness of a fastening member can result because of the excessive proportion of the driving torque needed to overcome friction.

The improvement which my invention teaches is based on a special solution to the problem of the forces acting on a body sliding with friction on an inclined plane, of which the helical screw is a special case. Briefly outlined, it will be appreciated that the axial force exerted during loading by a simple screw with frictionless thrust bearing can be expressed as a function of three parameters: the applied torque, the coefficient of friction along the sliding surfaces of the screw and the effective pitch angle of the threads. In like manner the axial force exerted during unloading can be expressed as a function of the same three parameters. If we take advantage of the similar physical conditions existing first for the last increment of loading and second for the first increment of unloading, the friction coefficient and axial force may be considered equal. The pitch angle is known and unvarying. The result may be expressed as two equations with but two unknowns: the axial load and the friction coefficient. These equations can be solved simultaneously for the axial force (or the friction coefficient) as a function of the torque to load and that to initiate unloading. While the general solution is rather complex and not readily adaptable to quick computation, the axial thrust can be expressed rather simply in series form. The first term of this series gives the axial thrust as a constant times the difference between the torque to load the torque to initiate unloading. For cases in which the friction angle is not greatly different from the pitch angle, this is a close approximation to the complete solution. As most holding screws are in this category, it is generally necessary only to measure the difference of the two torques to obtain a direct measure of the axial thrust. The simple difference of torques is unaffected by thrust bearing friction if this is equal for screw rotation in either direction, so that the approximate solution is applicable to screws having friction at a thrust bearing surface. My invention makes use of these considerations by providing an improvement in torque wrenches which permits convenient measurement of the difference between two torques of opposite direction.

It is another object of my invention to provide a practical improvement of conventional torque measuring wrenches which will allow convenient measurement of the difference of two opposite torques and indicate this difference on a scale.

It is another object of my invention to provide a simple accessory which may be attached to an existing torque measuring wrench to give a measure of the difference of two torques of opposite direction.

It is another object of my invention to provide a convenient calculator by which a measured difference in torque can be read directly in units of the axial thrust exerted by a screw member.

It is another object of my invention to provide a convenient calculator by which a measured difference in torque can be read directly in terms of the axial stress induced in a screw member.

It is yet another object of my invention to provide a torque difference measuring device which will not interfere with the normal torque measuring function of the conventional torque wrench.

Additional objects will be apparent from the accompanying specification, appended claims and drawings, in which:

Fig. 1 is a side view of a torque wrench adapted with a difference measuring device shown in the initial no torque position.

Fig. 2 shows a plan view of the wrench.

Fig. 3 shows the wrench indicating the final torque required to load a screw member.

Fig. 4 shows the wrench indicating the torque required to initiate unloading.

Fig. 5 shows the wrench at rest with a pointer at rest at a torque corresponding to the difference between the torque shown in Fig. 3 and that shown in Fig. 4.

Before describing specific instrumentation by which the objects of my invention can be realized in practice, an examination of the general theory underlying this type of load estimation is helpful in understanding the possibilities as well as the limitations of my method. In the foregoing summary description it was stated that the axial load is proportional to the difference between the torque required to load and that required to initiate unloading of a screw. This is quite analogous to the taking of differences in engine testing for eliminating friction from the tare on a Prony brake. Another example of friction elimination exists in a pulley system in which the load is estimated from the average of the pull required to raise the load and that to lower it times the mechanical advantage. The solution of the wedge with friction, of which the screw is a special case, is somewhat more complex so that only under certain restrictions can the load be accurately estimated from the difference (or algebraic average) of the loading and unloading forces.

Consider the problem of a body of weight R (unknown) resting on an inclined plane with slope angle $\alpha$. The horizontal force F required to raise the load is given by the expression $$F = R \tan(\phi + \alpha) \qquad (1)$$

where $\phi$ is the friction angle—usually designated as arc tan $\mu$; $\mu$ is the coefficient of friction.

For lowering the same load on the inclined plane, the horizontal force required is expressed by $$-F' = R \tan(\phi - \alpha) \qquad (2)$$

where the minus sign designates the reversal of direction of F' with respect to F if $\phi$ is greater than $\alpha$. If we assume the friction angle $\phi$ to be identical in Equations 1 and 2 and further define the load R in each case to be identical and unknown, the slope angle $\alpha$ to be identical and known, then we have two Equations 1 and 2 with but two unknowns —R the load and $\phi$ the friction angle. These equations are readily tractable, yielding as a solution for R $$R = \frac{(F+F')\cot 2\alpha}{2} + \left(\frac{F+F' \cot^2 2\alpha - 4FF'}{4}\right)^{1/2} \qquad (3)$$

For cases in which the pitch angle $\alpha$ is small, it is useful to expand Equation 3 into a series $$R = (F+F')\cot 2\alpha - \frac{FF' \tan 2\alpha}{F+F'} \qquad (4)$$

The first term on the right hand side of Equation 4 is proportional to the algebraic sum of the force required to raise the load and that required to lower it. If the friction angle $\phi$ is greater than the slope angle $\alpha$, the force to lower the load must act in the opposite direction from that required to raise the load, so the sign of F' becomes opposite that of F and (F+F') in Equation 4 represents a difference rather than a sum. The second term of Equation 4 is relatively small being zero, of course, if $\alpha$ and $\phi$ are equal, which causes F' to be zero in Equation 2. Additional terms of this Series 4 are not significant. For a taper angle of two degrees, the representation of the load R by the first term of Equation 4 alone would amount to an underestimate of about 0.9% for a friction coefficient of 0.1, 3.5% for $\mu=0.2$, and 7.5% for $\mu=0.3$. These percentages are representative of the errors inherent in using a simple torque difference to estimate the axial thrust exerted by a screw. It is generally necessary to make this approximation for the case of the screw, as only in this way can the friction on thrust-bearing, non-pitched surfaces be cancelled.

To apply the approximate solution for the inclined plane problem to the case of a helical screw, it is necessary to substitute for the force F to load $$F = T/\tau \qquad (5)$$

and for F' the force to unload $$F' = T'/\tau \qquad (6)$$

where T is the final torque used to tighten the screw, T' is the torque required to initiate loosening of the screw and $\tau$ is a mean effective radius of the threads. The cot $2\alpha$ for the screw can be estimated from the equation $$\cot 2\alpha = \frac{\pi \tau N}{n} - \frac{1n}{4\pi \tau N} \qquad (7)$$

where N is the number of threads per unit of length and $n$ is the ratio of the lead to the pitch of the screw. If $\alpha$ is a small angle one can approximate cot $2\alpha$ by neglecting the second term of (7) yielding $$\cot 2\alpha \cong \frac{\pi \tau N}{n} \qquad (8)$$

Upon substituting Equations 5, 6 and 8 in the first term of Equation 4 we have $$R \cong (T-T')\frac{\pi N}{n} \qquad (9)$$

Thus it is seen that using Equation 9 the axial force exerted by a screw can be estimated from the difference between the torque required to tighten the screw and that required to loosen it times a constant readily determined from commonly used specifications of a screw.

The validity of this method of solution to the screw load problem is based on the assumption of a constant coefficient of friction on the bearing surfaces of the screw and non-pitched thrust surfaces for the sliding resulting from either direction of rotation. It has been demonstrated from laboratory experiments with the ordinary contaminants existing on screw fastenings, this constant friction condition is realized rather closely. The absolute values of the friction coefficient, on the other hand, may vary widely between extreme values, by factors of two, three or more with variation in surface conditions and lubrication. From this, it can be appreciated that axial force measurement from the difference of two torques is a measure vastly more accurate than that from a single torque measurement.

In addition to a novel method of force determination for a screw, my invention embodies a simple mechanism by which measurement of the difference of two torques in opposite directions can be readily effected. The subtraction mechanism is shown for purpose of illustration in combination with a flexible beam type torque wrench. In principle, however, a similar mechanism could be applied to other types of torque measuring wrenches, including those using a circular dial for the torque indicator, without departing from the scope of the present invention.

The arrangement of components in the zero load position is shown in side elevation in Figure 1 and in plan view in Figure 2 showing the flexible beam type torque wrench in position ready to tension screw member 1 by turning nut 2. The nut is connected to the torque wrench using a socket member 3. Torque is applied from handle 6 through flexible beam 5 and hub 4 to the socket 3 and nut 2. Torque is indicated by the relative movement of scale 8 attached to flexible beam 5 with respect to the pointer 7 fixed in orientation with respect to hub 4. These elements are all part of commonly used torque wrenches and are therefore not the objects of invention in the present case.

My improvement for measuring the difference between two torques includes a rigid support 9, indicating levers 11 and 12 rotatable about pivot 10 and a stop 13 affixed to prevent levers 11 and 12 from crossing the center of scale 8. The levers 11 and 12 are further constrained one each to either side of fixed pointer 7. Pointer 7 and support 9 form a rigid extension of hub 4. In operation it can be seen from Figure 3 that when force F is applied through handle 6 the relative movement between the mid-point stop 13 of scale 8 and the fixed pointer 7 causes levers 11 and 12 to separate an amount directly indicative of the torque to load T on scale 8. Upon reversal of the wrench to measure the torque required to initiate unloading of the screw, Figure 4 shows the relative disposition of elements with application of force F'. The angle between 11 and 12 remains fixed, the pair being bodily rotated with respect to fixed pointer 7 by stop 13 acting on lever 11 an amount directly proportional to the torque to unload T' on scale 8. Figure 5 shows the result of removal of the applied torque wherein the difference of torques (T—T') is indicated by the position of lever 12 on the scale 8. Readying the indicating levers for a new measurement can be readily accomplished by squeezing them together with the fingers with the wrench in the no torque position of Fig. 5.

To obtain proper operational sequence, first of relative rotation of levers 11 and 12 with respect to each other and secondly their rotation as a unit with respect to the wrench hub 4 and support 9 it is sufficient to have the frictional resistance to rotation greater between the two levers 11 and 12 than between either of these two and the fixed pivot 14. Fig. 1 shows a practical arrangement for accomplishing this. A resilient member 16 is compressed so as to apply equal axial force to the pivot surfaces of indicating levers 11 and 12, and to the spacing washer 15. The faces of the spacing washer 15 in contact with the levers 11 and 12 have raised peripheral ridges which serve to produce bearing surfaces on a ring of well defined radius. The radius of these ridges on both sides of washer 15 interposed between levers 11 and 12 is made greater than that of washer 16 and the head of pivot screw 14 which bound the outer surfaces of levers 11 and 12. As resilient member 16 when compressed by pivot screw 14 maintains an equal load on each washer, the frictional resistance to torsion at the larger washer 15 will be greater than that on resilient washer 16 and the head of pivot screw 14, thus producing the desired sequence in the rotation of levers 11 and 12.

In operation as a practical tool it is anticipated that a torque difference would be specified from calculations using Eq. 9 to give a desired holding force and/or stress level in the fastening member. The torque difference requirement could be specified either in addition to or even in lieu of the customary specification of torque to load. In assembling a member held by many similar fastenings of like surface condition and thus of like frictional characteristics, one could from a few trials tightening and initiating loosening, arrive at a torque to load which would produce a desired holding force. This value of torque could then be used on all the similar fastenings with only a final check by the torque reversal and difference measurement and then a retightening to the original torque as described herein. Indeed if the uniformity among a series of similar fastenings became evident, one might then omit the check of torque difference with each fastening and only check an occasional fastening.

It will be appreciated from the foregoing discussion that the greatest torque difference as compared to the maximum torque, will occur when the frictional resistance is low both on the inclined surface of the screw and on the non-reactive thrust bearing surfaces. The accuracy of the load estimate generally will increase as friction is decreased not only in the improvement inherent in approaching the pitch angle with the friction angle, as seen in Eq. 4, but also in realizing a more sizable and thus readily measured torque difference as compared to the maximum torque. Further advantage is accrued from the natural tendency of low sliding friction to be characterized by the absence of the stick-slip phenomena which is required for the present method to be operative. Thus the presence of friction reducing surface treatments on fastenings is very desirable for present purposes. In ascribing a friction angle to a thread it is appreciated that the effective friction angle on a V thread is greater (by secant of half the root angle) than that for a square cut screw.

Although values of the friction coefficient will vary widely from surface to surface, there is a tendency for it to remain fixed during the loading of a given screw member. This fact will permit an operator using the present wrench to more readily ascertain the torque required to produce a given axial thrust or torque difference by considering that the ratio of the torque difference to the torque load should remain largely unchanged as the loading proceeds. For example if an operator found that the torque difference upon a first trial was 30 percent less than the required value, he would then try increasing the torque to load by 30 percent.

Numerous modifications within the scope of my invention will occur to those skilled in the art. For example, instead of specification of a torque difference for each case requiring a well controlled holding force, one might utilize a scale reading directly in holding force for a screw of a given thread pitch, rather than in torque. The scales provided could also be calibrated to read in terms of axial stress in the fastening member.

Although the usual purpose of a torque wrench is to tighten a fastening, the method of the present invention is applicable to load estimation in lifting jacks and to the radial force exerted by tapered wedges in a ring or in a segmented mandrel.

While I have shown and described the preferred embodiment of my invention, I wish it to be understood that I do not confine myself to the precise details of construction herein set forth, by way of illustration, as it is apparent that many changes and variations may be made therein by those skilled in the art, without departing from the spirit of the invention or exceeding the scope of the appended claims.

What I claim is:

1. In a torque wrench having a scale with a zero position defining two sides thereof and an indicating lever movable in an arcuate path in registry with said scale from said zero on a side unique to a direction of applied torque and in amplitude proportional to the magnitude of applied torque, a pivot located at the center of curvature of said scale, a second lever mounted on said pivot and rotatable in an arcuate path in registry with one side of said scale and displaced thereon by said indicating lever, a third lever mounted on said pivot and rotatable in an arcuate path in registry with the other side of said scale and displaced thereon by said indicating lever, a restraining member mounted on said scale at its zero position preventing said second and third levers from crossing the zero on said scale, a friction coupling between said second and third indicating levers acting to resist relative rotation therebetween of greater magnitude than the friction inherent in contact of either of said levers on said pivot.

2. In a torque wrench having a scale with a zero position and an indicating lever movable in registry with said scale in amount directly proportional to torque applied by said wrench, a fixed pivot on the central axis of said scale, a first supplementary lever rotatable about said pivot in registry with said scale and having positive interference with said indicating lever so as to be displaced thereby in excursions in one direction away from said zero position, a second supplementary lever rotatable about said pivot in registry with said scale and having positive mechanical interference with said indicating lever so as to be displaced thereby in excursions in the other direction away from said zero, a member having positive interference with said supplementary levers so as to prevent their crossing said scale zero, a first friction coupling between the first supplementary lever and said pivot, a second friction coupling between the second supplementary lever and said pivot, a third friction coupling between said first and second supplementary levers of greater magnitude than said first or said second friction coupling.

3. An attachment for a torque wrench having a scale with a zero position and an indicator pointer in registry therewith and displaceable from said zero in amount proportional to applied torque and in direction unique to direction of torque application, comprising a supplementary pointer moveable in registry with said scale, means for advancing said supplementary pointer a distance from scale zero proportional to a first excursion of said indicating pointer, means for retracting said supplementary pointer a distance proportional to a subsequent reversed excursion of said indicator pointer, the supplemental pointer thereby retaining displacement proportional to the difference between said first and said subsequent excursions of said indicating pointer.

4. A device as in claim 3 wherein the scale is calibrated in units or torque times the number of threads per unit length divided by the ratio of lead to pitch both of a given screw member, times $\pi$.

5. A device as in claim 3 wherein the scale is calibrated in units of torque times the number of threads per unit length divided by the ratio of lead to pitch and the cross-sectional area, all of a given screw member, times $\pi$.

References Cited in the file of this patent

UNITED STATES PATENTS 2,283,707 Sturtevant _____ May 19, 1942
2,348,098 Storrie _____ May 2, 1944
2,441,608 Warner _____ May 18, 1948

FOREIGN PATENTS 621,277 France _____ Jan. 31, 1927